US 8,493,903 B2

(12) United States Patent
Chung et al.

(10) Patent No.: US 8,493,903 B2
(45) Date of Patent: Jul. 23, 2013

(54) METHOD OF SETTING UP DYNAMIC MULTICAST AND BROADCAST SERVICE ZONE FOR PROVIDING MOBILE INTERNET PROTOCOL TELEVISION SERVICE

(75) Inventors: Yeon-Joon Chung, Daejeon-si (KR); Young-Il Kim, Daejeon-si (KR); Sun-Sim Chun, Daejeon-si (KR); Yong-Su Lee, Daejeon-si (KR); Dae-Geun Park, Daejeon-si (KR); Young-Soo Park, Daejeon-si (KR); Sung-Hee Kim, Daejeon-si (KR); Cheol-Hye Cho, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 66 days.

(21) Appl. No.: 13/335,753

(22) Filed: Dec. 22, 2011

(65) Prior Publication Data

US 2012/0163272 A1 Jun. 28, 2012

(30) Foreign Application Priority Data

Dec. 22, 2010 (KR) .................. 10-2010-0132430

(51) Int. Cl.
*H04H 20/71* (2008.01)
*H04B 7/00* (2006.01)
*H04W 4/00* (2009.01)
*H04J 3/26* (2006.01)

(52) U.S. Cl.
USPC ............ 370/312; 370/329; 370/432; 455/509

(58) Field of Classification Search
None
See application file for complete search history.

(56) References Cited

U.S. PATENT DOCUMENTS

| | | | |
|---|---|---|---|
| 2009/0154386 A1* | 6/2009 | So et al. | 370/311 |
| 2009/0207773 A1 | 8/2009 | Feng et al. | |
| 2010/0061289 A1* | 3/2010 | Mun et al. | 370/312 |
| 2010/0110963 A1* | 5/2010 | Huang et al. | 370/312 |
| 2010/0302986 A1* | 12/2010 | Kim et al. | 370/312 |
| 2011/0116434 A1* | 5/2011 | Kuo et al. | 370/312 |
| 2011/0134822 A1* | 6/2011 | Lee | 370/312 |
| 2011/0164547 A1* | 7/2011 | Kim et al. | 370/312 |
| 2011/0164548 A1* | 7/2011 | Kim et al. | 370/312 |
| 2011/0292859 A1* | 12/2011 | So et al. | 370/312 |

OTHER PUBLICATIONS

Cheng, Ray-Guang et al., "Radio Resource Allocation for Overlapping MBS Zones," IEEE Mobile WiMAX Symposium, pp. 75-80 (2009).
Lee, Ji Hoon et al., "Location Management Area (LMA)-based MBS Handover in Mobile WiMAX Systems," 3rd International Conference on Communication Systems Software and Middleware and Workshops, COMSWARE, pp. 341-348 (2008).

* cited by examiner

*Primary Examiner* — Clemence Han
(74) *Attorney, Agent, or Firm* — Nelson Mullins Riley & Scarborough LLP; EuiHoon Lee, Esq.

(57) ABSTRACT

A technology of setting up a MBS zone for providing a mobile IPTV service is provided in which the MBS zone is effectively managed, so that QoS is prevented from being degraded due to the handover delay that is caused by a MBS handover occurring when a user moves between MBS zones.

18 Claims, 6 Drawing Sheets

METHOD OF SETTING UP DYNAMIC MULTICAST AND BROADCAST SERVICE ZONE FOR PROVIDING MOBILE INTERNET PROTOCOL TELEVISION SERVICE

CROSS-REFERENCE TO RELATED APPLICATION

This application claims the benefit under 35 U.S.C. §119(a) of Korean Patent Application No. 10-2010-0132430, filed on Dec. 22, 2010, the disclosure of which is incorporated by reference in its entirety for all purposes.

BACKGROUND

1. Field

The following description relates to a technique of setting up a dynamic Multicast and Broad Service (MBS) zone for providing an Internet Protocol Television Service (IPTV), and more particularly, to a technique of setting up a dynamic MBS zone for supporting stable macro diversity of MBS services and ensuring QoS for users in various service scenarios.

2. Description of the Related Art

Mobile Internet Protocol Television (IPTV) service has garnered a large amount of interest as a main service of the fourth generation mobile communication system, and many studies have been recently undertaken on this technology.

The mobile IPTV service is a technology in which convergence of broadcasting and telecommunication is achieved to such that a user can receive a broadcast services while on the move. Supporting a multicast service in a network of a general service provider causes significant load, and if a predetermined router fails to support the multicast, the broadcast service is not be provided.

According to an example of several standardizations involving the compensation for such drawbacks, a seamless broadcast service using a MBS zone is provided. The MBS zone is formed using a plurality of base stations and provided as a single service zone. Since multicast parameters are shared in the same MBS zone, if a user movement is made between the base stations, the service is provided without resetting.

In order to provide such a MBS function, Multimedia Broadcast/Multicast Service (MBMS) is introduced in wideband CDMA (WCDMA)/Global System for Mobile communication (GSM), 3GPP specification. In addition, Multicast and Broadcast Service (MBS) is introduced into the latest protocol IEEE802.16e/16m by Institute of Electrical and Electronics Engineer (IEEE).

The MBMS and MBS are specifications used to deliver data from a single data source to a plurality of users in a mobile network. According to the MBMS and MBS, a mobile network provides a point to multipoint service allowing data to be transmitted from a single data source to a plurality of users. Therefore, network resources are shared and the utilization of the network resources is enhanced.

The MBMS and MBS can implement the multicast and broadcast of a high speed multimedia service as well as the multicast and broadcast of low speed messages, such as a simple text.

However, the range of action of a user may be limited to an area in which the broadcast service is provided within the MBS zone. In addition, in the case of a high quality multimedia service that is affected by a mobile environment, QoS is not guaranteed.

In this regard, there is a need to a technology of setting up a MBS zone based on the mobility of a user in which the MBS zone is dynamically set up depending on the movement of a user between different MBS zones, the safer and faster migration of the MBS zone is provided and thus a high quality multimedia service is effectively provided in a mobile environment.

SUMMARY

The following description relates to a technology of setting up a MBS zone for providing a mobile IPTV service, in which the MBS zone is effectively managed, so that QoS is prevented from being degraded due to the handover delay that is caused by a MBS handover occurring when a user moves between MBS zones.

The following description also relates to a technology of setting up the MBS zone, in which the MBS zone is effectively selected, so that a stable macro diversity of MBS service is supported and the improved QoS is provided to the user in various service scenarios.

In one general aspect, there is provided a method of setting up a dynamic Multicast and Broadcast Service (MBS) zone for providing a mobile Internet Protocol Television (IPTV) service, the method including: setting up a MBS zone based on a base station (BS) forming a cell having a mobile terminal; and setting up a MBS zone by allocating MBS channels to base stations adjacent to the base station (BS) according to a movement tendency that the mobile terminal moves from the base station (BS) to the base stations adjacent to the base station (BS).

In another general aspect, there is provided a method of setting up a dynamic Multicast and Broadcast Service (MBS) zone in a mobile communication system including a mobile terminal, a base station, an Access Service Network Gateway (ASNG) gateway, an Authentication Authorization and Accounting (AAA) server and a MBS Controller Server, the method including: at the mobile terminal, making a request of the ASN gateway for a MBS service through a MBS zone that is formed of at least one base station; at the ASN gateway, making a request of the AAA server for authentication of the mobile terminal; at the ASN gateway, making a request of the MBS Control Server for information about the requested MBS service, if the authentication of the mobile terminal is complete in the AAA server; at the MBS Controller Server, allocating a MBS channel for each base station according to a movement tendency of the mobile terminal; and at the ASN gateway, instructing to set up a MBS zone based on the MBS channel that is allocated for each base station.

The method further includes at the mobile terminal, receiving the MBS service through the set MBS zone that is set up.

The method further includes at the mobile terminal, making a request of the ASN gateway for a MBS service through adjusting the set MBS zone, if a handoff occurs when the mobile terminal leaves a base station, which forms a cell where the mobile terminal exist, in the middle of receiving the MBS service via the set MBS zone.

The requesting for authentication of the mobile terminal includes at the ASN gateway, collecting subscriber identifier (ID) information, terminal identifier (ID) information and access node identifier (ID) information for the MBS service from the mobile terminal.

In the requesting for the information about the MBS service, the ASN gateway makes a request of the MBS Control/ Server for a profile about a MBS zone setting and the requested MBS service.

The allocating of the MBS channel for each base station includes: at the MBS server, probabilistically calculating the movement tendency that the mobile terminal moves from a base station (BS) forming a cell having the mobile terminal to each base station adjacent to the base station (BS)

The allocating of the MBS channel for each base station includes: acquiring statistic information about the movement tendency and probabilistically calculating the movement tendency based on the statistic information; or allocating the MBS channel according to an order of priority that is placed on each of the adjacent base stations by use of the calculated probabilistic movement tendency.

The allocating of the MBS channel for each base station includes: at the MBS Control Server, providing the ASN gateway with service profile, schedule information and additional MBS zone information that are used to generate the MBS channel.

The allocating of the MBS channel for each base station includes: determining the number of base stations used to form a MBS zone between seven or nineteen based on the movement tendency including a direction or speed of movement of the mobile terminal.

The instructing of setting up the MBS zone includes: storing the MBS channel for the mobile terminal in a channel cache table included in each base station that creates the set MBS zone.

The instructing of setting up includes if a base station, which forms a MBS zone providing the mobile terminal with a MBS service, is excluded from forming a new MBS zone due to the movement tendency of the mobile terminal, removing a MBS channel for the mobile terminal from a channel cache table included in the base station.

As described above, the example can provide a seamless high quality multimedia service by preventing the handover delay between MBS zones occurring when a user moves between the MBS zones.

In addition, the example can prevent the multicast and broadcast traffic from being unnecessarily transmitted to a plurality of base stations to reduce the handover delay.

In addition, the example can prevent the handover delay of multicast channel factors that occur when a user moves between MBS zones.

In addition, the example can provide a high quality multimedia service through the above described MBS zone setting method.

In addition, the example can resize the MBS zone, thereby preventing broadcasting traffic from being transmitted to undesired base stations having no users.

In addition, a base station having a chance that a user enters is dynamically added to the MBS zone, thereby preventing a high quality multimedia service from being degraded due to the handover delay over different MBS zones from having to perform a multicast channel ID mapping when a user movement is made between MBS zones.

Other features will become apparent to those skilled in the art from the following detailed description, which, taken in conjunction with the attached drawings, discloses exemplary embodiments of the invention.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1:
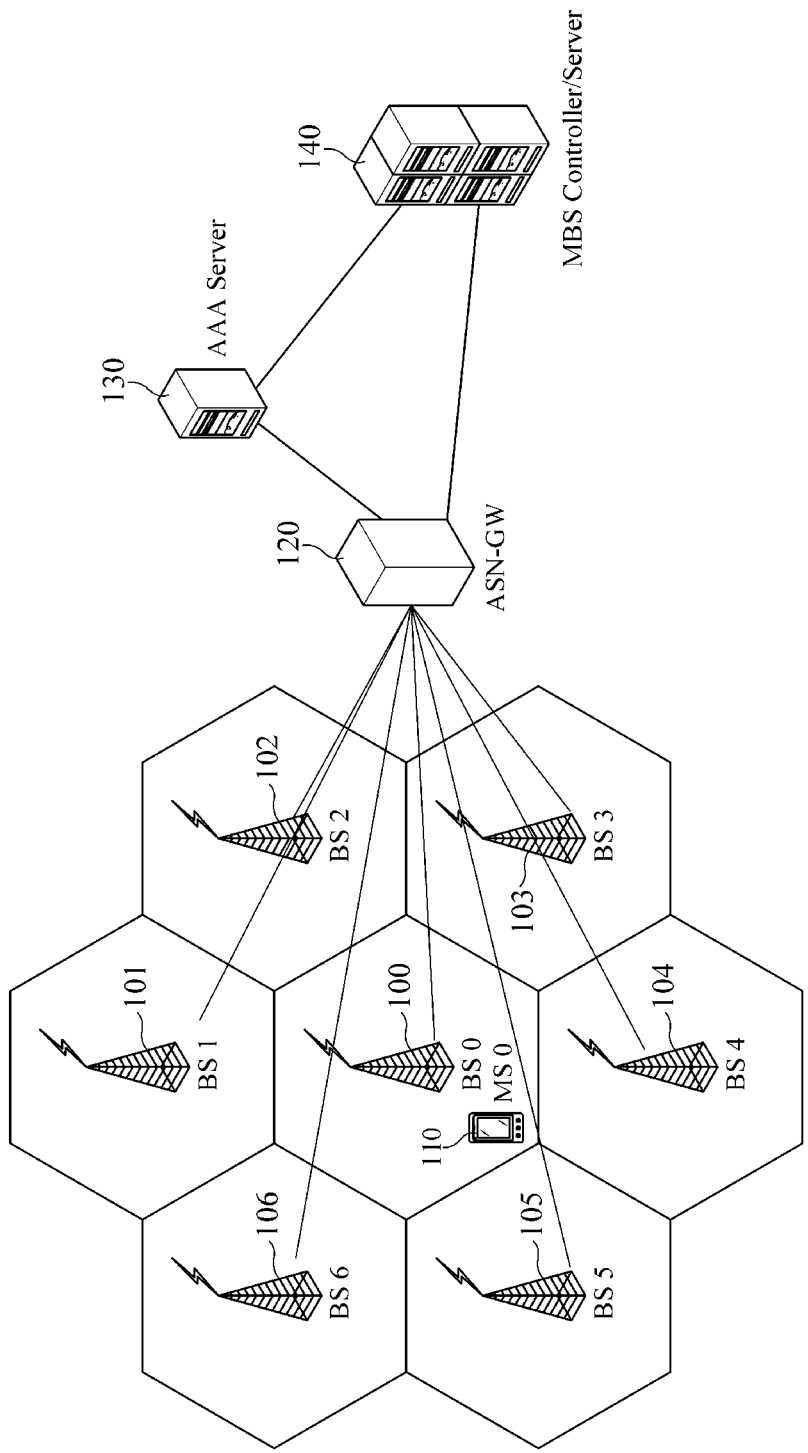
FIG. 1 is a diagram illustrating an example of a mobile communication system forming a MBS zone.

FIG. 1 is a diagram illustrating an example of a mobile communication system forming a MBS zone.

As shown in FIG. 1, a mobile terminal MS0 110 of a mobile communication system uses a base station BS0 100. Six base stations including a base station BS1, a base station BS2, a base station BS3, a base station BS4, a base station BS5 and a base station BS6 101, 102, 103, 104, 105 and 106 are disposed adjacent to the base station BS0 100. In FIG. 1, the seven base stations 100, 101, 102, 103, 104, 105 and 106 form a single MBS zone. The mobile terminal MS0 200 may move from the base station BS0 100 one of the six base stations 101, 102, 103, 104, 105 and 106. In addition, the mobile communication system further includes an Access Service Network Gateway (ASN-GW) 120, a MBS Controller/Server 140, and an Authentication Authorization and Accounting (AAA) server 130 in addition to the mobile terminal MS0 110 and the base stations 100, 101, 102, 103, 104, 105 and 106. The ASN-GW 120 serves as a MBS service gateway for the base stations 100, 101, 102, 103, 104, 105 and 106 and as a router in addition to controlling the base stations 100, 101, 102, 103, 104, 105 and 106. The MBS Controller/Server 140 performs a zone management for a MBS service, a service announcement and a service configuration management. The AAA server 130 handles a subscriber identifier (ID), a terminal identifier (ID) and information about authentication request of a desired type of services.

Figure 2:
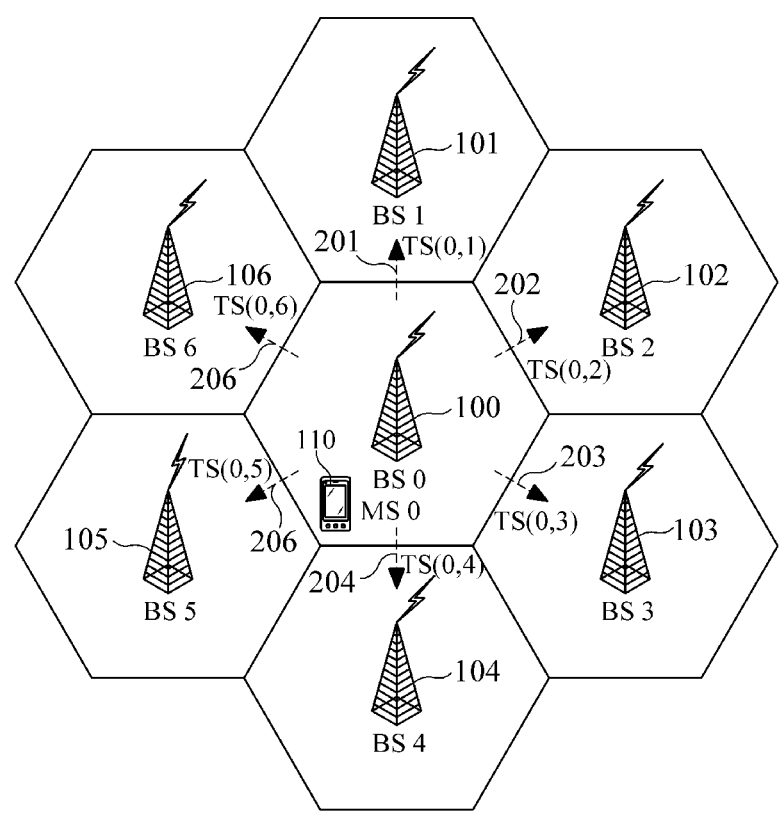
FIG. 2 is a diagram illustrating an example of a chance that a mobile terminal moves between base stations.

FIG. 2 is a diagram illustrating an example of a chance that a mobile terminal moves between base stations.

According to this example, the MBS zone is variably set up by placing an order of priority on each base station based on the mobility of users. In FIG. 2, the chance that the mobile terminal MS0 110 moves from the base station BS0 100 to the base station BS1 101 may be represented as a value of TS (0, 1) denoted as reference numeral 201 and.

The chances that the mobile terminal MS0 110 moves from the current base station BS0 100 to base stations 101, 102, 103, 104, 105 and 106 are represented TS values (0, 1), (0, 2) (0, 3) (0, 4) (0, 5) and (0, 6), respectively, denoted as reference numerals 201, 202, 203, 204, 205 and 206. The TS value is obtained by probabilistically calculating the chance for the mobile terminal MS0 to move to each base station, and the sum of the TS values is defined as "1".

In FIG. 2, if the TS value (0, 2) 202 is "0.6" and the TS value (0, 3) 203 is "0.3", the chance for the mobile terminal MS0 110 to move from the base station BS0 100 to the base station BS3 103 is twice the chance for the mobile terminal MS0 110 to move to the base station BS2 102.

Such probability values are obtained using previous statistic information about the movement tendency for the mobile terminal. If the TS value (0, 4) is "0", it is known that the mobile terminal MS0 has not moved from the base station BS0 100 to the base station BS4 104. In this case, the base station BS4 104 is excluded from creating a MBS zone.

Figure 3:
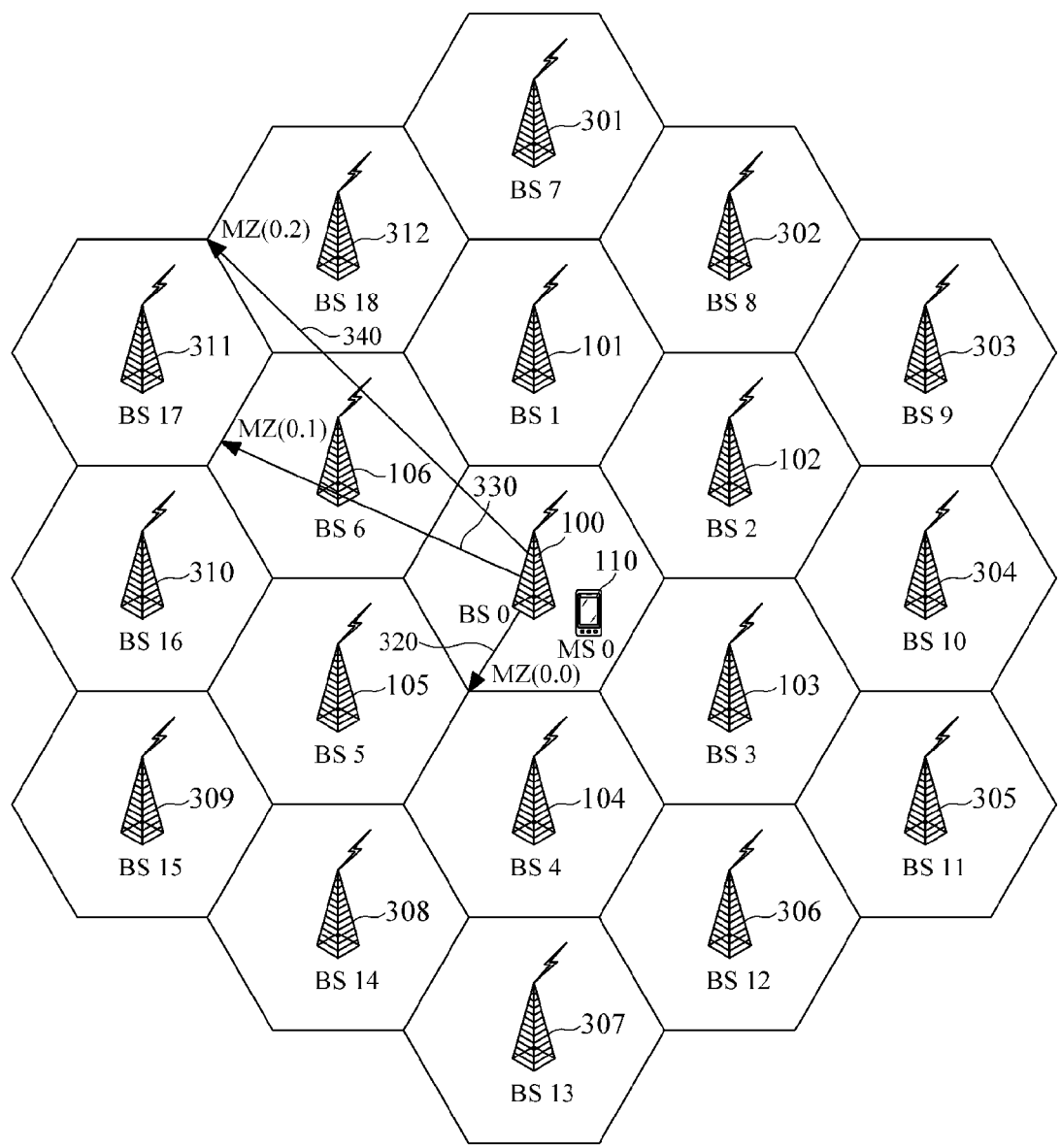
FIG. 3 is a diagram illustrating an example of a MBS zone forming method according to the size of MBS zones.

FIG. 3 illustrates an example of a MBS zone forming method according to the size of the MBS zone. In FIG. 3, an example of a method of forming a MBS zone is defined and shows three types of MBS zones.

The three types of MBS zones includes a MBS zone MZ [0, 0] 320, a MBS zone MZ[0, 1] 330 and a MBS zone MZ [0, 2] 340. The MBS zone MZ [0, 0] 320 is formed using one base station BS0 100. The MBS zone MZ[0, 1] 330 is formed using the base station BS0 100 and six adjacent base stations 101, 102, 103, 104, 105 and 106. The MBS zone MZ [0, 2] 340 includes the six adjacent base stations 101, 102, 103, 104, 105 and 106 and the twelve adjacent base stations 301, 302, 303, 304, 305, 306, 307, 308, 309, 310, 311 and 312.

Accordingly, the MBS zone MZ [0, 2] 340 forms a single MBS zone using nineteen base stations. There may be a need for MBS service channels to be allocated in consideration of many users and various services. In this case, MBS channels for a MBS zone may be allocated by placing the order of priority on each base station based on the size of the TS value for each base station.

According to this example, the above described three types of MBS zones may be created by the MBS Controller/Server 140 of FIG. 1. In addition, the TS values used to configure the MBS zone are also generated and managed by the MBS Controller/Server 140 of FIG. 1. In this example, the MBS Controller/Server 140 flexibly configures the multicast channels. As described above, the order of priority, which is required to allocate resources upon a demand for a new channel generation, is calculated using the TS value for base stations and the MZ value that limits the size of a desired MBS zone.

Figure 4:
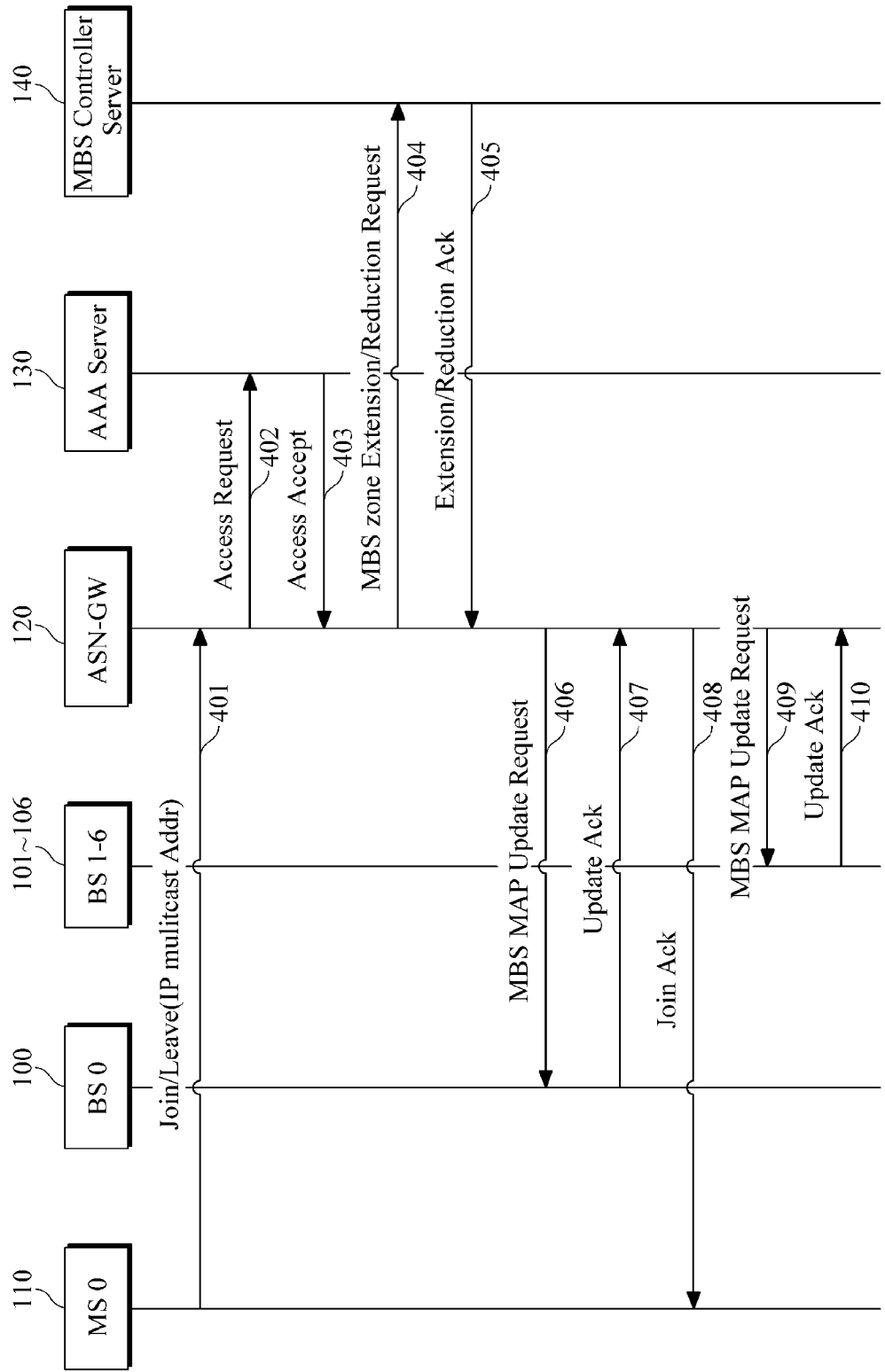
FIG. 4 is a diagram illustrating an example of a method of creating or canceling a MBS zone in the mobile communication system of FIG. 1.

FIG. 4 is a diagram illustrating an example of a method of creating or canceling a MBS zone in a mobile communication system of FIG. 1. As shown in FIG. 4, a MBS zone may be created or canceled by the mobile terminal MS0 110 through the components of the mobile communication system including the ASN-GW 120, the MBS Controller/Server 140 and the AAA server 130.

The mobile terminal MS0 makes a request of the ASN gateway for a new MBS service, such as IPTV services, by transmitting identification (authentication) information including a subscriber identifier (ID), a terminal identifier (ID) and an access node identifier (ID) to the ASN-GW 120 (401). The ASN-GW 120 makes a request of the AAA server 130 for user authentication by transmitting the received identification (authentication) information to the AAA server 130 (402).

If the user authentication is finished (403) in response to the request for user authentication, the ASN-GW 120 makes a request of the MBS control/server 140 for a profile about a new MBS zone setting and the new MBS service (404).

Upon the request by the AGN gateway in operation 404, the MBS Controller/Server 140 calculates the TS values of base stations, which are used to form a MBS zone, according to the MZ value, which limits the size of a MBS zone with respect to each base station, thereby determining whether to allocate a new channel.

The calculated TS values are compared to each other, and if a base station having a priority for allocation of MBS service channel exists, the MBS Controller/Server 140 sends the ASN-GW 120 a service profile, schedule information and additional MBS zone information that are used to generate the channel in an acknowledgment (405).

The ASN-GW 120 generates a MBS Map for the base station BS0 100 and the base stations BS1 to BS6 101 to 106, and informs the base station BS0100 and the base stations BS1 to 6 BS6 101 to 106 that the MBS Map is generated (406 and 409).

The base stations BS0 100 and the base stations BS1 to BS6 101 to 106 generate MBS channels by monitoring channel information based on the generated MPB Map, and notify the ASN-GW 120 of the generating of MBS channel (407 and 410).

Thereafter, the mobile terminal MS0 110 receives a response to the request for the new MBS service (408).

In this manner, the above described procedure of creating the MBS zone is completed, and the mobile terminal MS0 110 receives the MBS service through the new MBS zone.

In addition, the mobile terminal may make a request for a MBS service termination. The requesting for the MBS service termination corresponds to a process of canceling the MBS zone, and proceeds similar to the above described process of creating the MBS zone. In the process of canceling the MBS zone, the mobile terminal may terminate the service without the acknowledgment from the ASN-GW 120.

Figure 5:
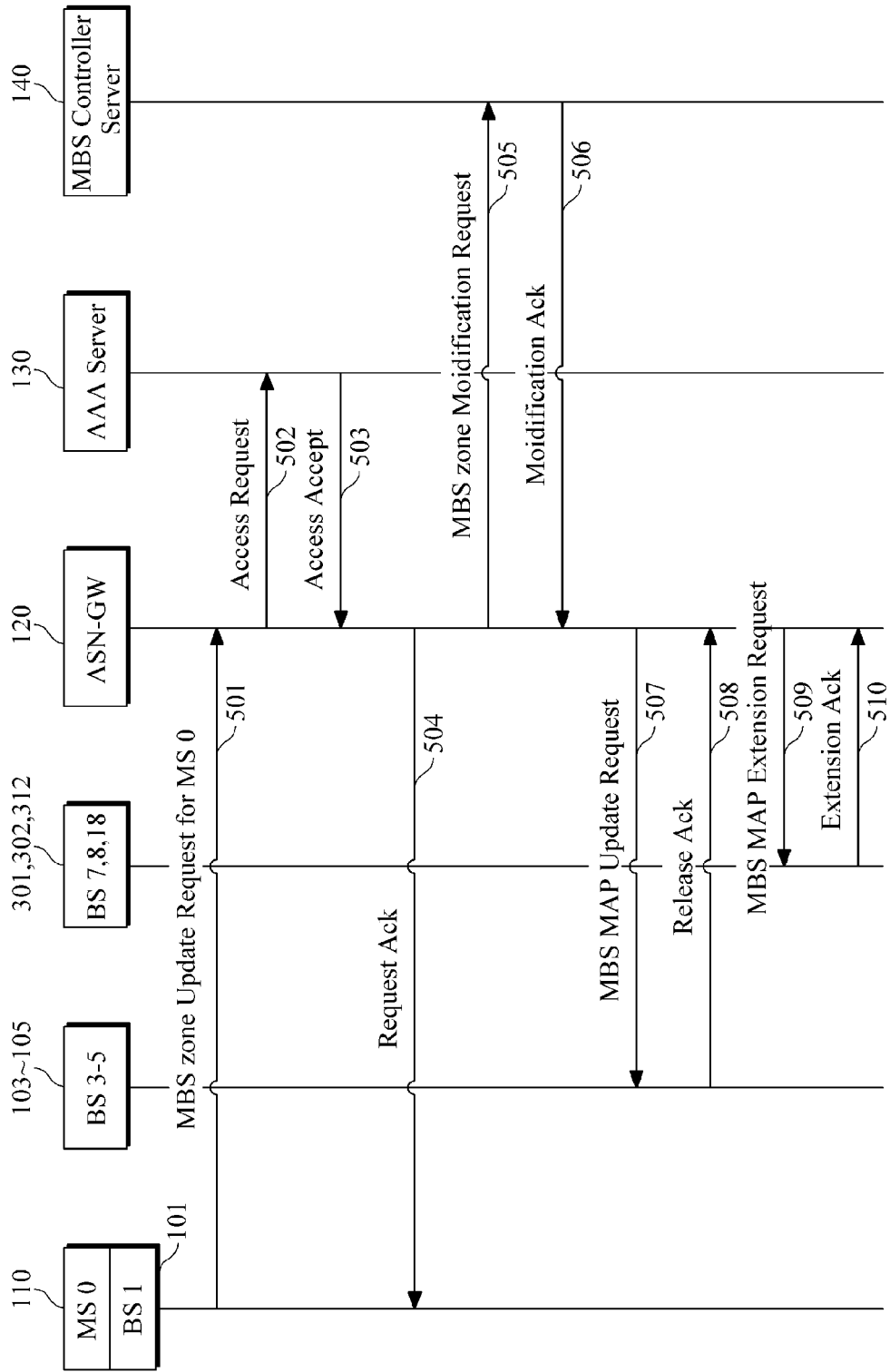
FIG. 5 is a diagram illustrating an example of the change of a MBS zone made when a mobile terminal moves between base stations.

FIG. 5 illustrates an example of the change of a MBS zone made when a mobile terminal moves between base stations. In FIG. 5, the change of the MBS zone is made when the mobile terminal MS0 110 moves from the base station BS0 100 to the base station BS1 101.

In this example, the MBS zone MZ [0, 1] shown in FIG. 3 is assumed as a basic implementation of a MBS zone. In FIG. 5, while in use of a MBS service through the base station BS0, the mobile terminal MS0 may move to the base station BS1 101. In order for the mobile terminal 110 to keep receiving the MBS service while on the move, the mobile terminal 110 or the base station BS1 101 makes a request of the ASN-GW 120 for modification of the MBS zone (501). To this end, the ASN-GW 120 receives identification (authentication) information including a subscriber identifier (ID), a terminal identifier (ID) and an access node identifier (ID) (401) from the mobile terminal MS0 110 or the base station BS1 101.

The ASN-GW 120 performs user authentication through the AAA server 130 by use of the received identification (authentication) information including a subscriber identifier (ID), a terminal identifier (ID) and an access node identifier (ID) (502 and 503).

After the user identification is completed, the ASN gateway 120 sends an acknowledge message to the mobile terminal MS0 110 or the base station BS1 101, thereby notifying that the modification of MBS zone is to be performed (504).

The ASN-GW 120 makes a request of the MBS Controller/Server 140 for the modification of the MBS zone 505 by sending service information to the MBS Controller/Server 140 (505). The MBS Controller/Sever 140 sends a Modification Acknowledge to the ASN-GW 120 (506). The MBS Controller/Server 140 requests base stations including the base stations BS3 to BS5 103 to 105, which support a new MBS service in cooperation with newly added base stations BS7 and BS8 301, 302 and 312, and the base stations BS7 and BS8 301, 302 and 312 to store MBS channels in their channel cache tables (507 and 509). If the allocation of MBS channels is finished and the base stations BS3 to BS5 103 to 105 and the base stations BS7, BS8 and BS 18 301, 302 and 312 notify the ASN-GW 120 that the channel allocation has been completed (508 and 510).

In allocating the MBS channel, the MBS Controller/Server 140 performs allocation of the MBS channel by extracting TS values of each base station, (see FIG. 2), and placing the order of priority on each base station.

Figure 6:
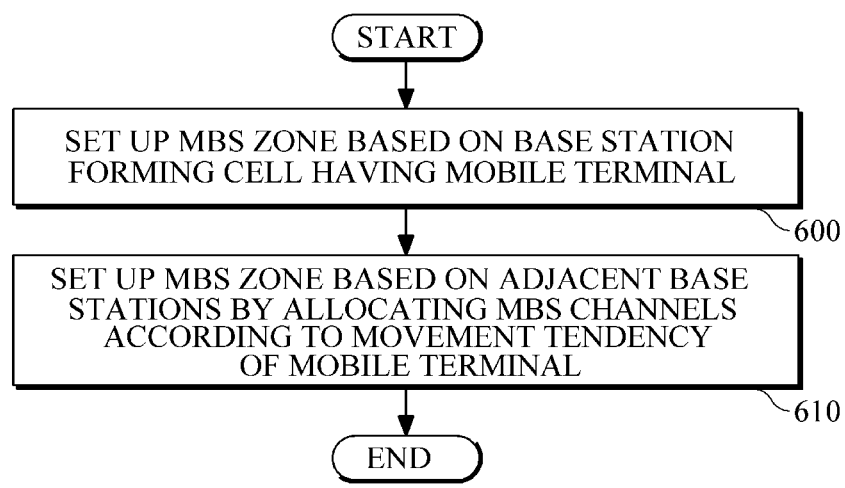
FIG. 6 is a diagram illustrating an example of a method of setting up the MBS zone.

FIG. 6 is a flowchart illustrating an example of a method of setting up the MBS zone.

A method of setting up a MBS zone for providing a mobile Internet Protocol Television (IPTV) service includes setting up a MBS zone based on a base station (BS) forming a cell having a mobile terminal (600), and setting up a MBS zone by allocating MBS channels according a movement tendency that the mobile terminal moves to base stations adjacent to the base station (BS) (610).

In detail, in the setting of the MBS zone through allocating the MBS channel (610), a MBS zone is set up by allocating MBS channels to six adjacent base stations, into which the mobile terminal is movable from a base station (BS). Accordingly, a single MBS zone for the mobile terminal may be set up based on seven base stations including the base station (BS) and the six adjacent base stations, as shown in the MBS zone MZ [0, 1] of FIG. 3.

In addition, in the setting of the MBS zone through allocating the MBS channel (610), a MBS zone is set up by allocating MBS channels to the seven base stations forming the single MBS zone and twelve adjacent base stations, which are adjacent to the seven base stations forming the single MBS zone. Accordingly, a single MBS zone for the mobile terminal may be set up based on nineteen base stations including the seven base stations and the twelve adjacent base stations, as shown in the MBS zone MZ [0, 2] of FIG. 3.

That is, in the setting of the MBS zone through allocating the MBS channel, the number of base stations forming a single MBS zone is determined between seven and nineteen in consideration of the movement tendency including a direction or speed of movement of the mobile terminal.

In addition, TS values are obtained by probabilistically calculating the movement tendency, which the mobile terminal moves from the base station (BS) to each base station adjacent to the base station (BS). Further, statistic information about the movement tendency is acquired and the movement tendency is probabilistically calculated from the statistic information.

In addition, the MBS channel of each of the adjacent base stations is allocated according to the order of priority that is placed on each of the adjacent base stations by use of the calculated probabilistic movement tendency.

The disclosure can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion.

Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of setting up a dynamic Multicast and Broadcast Service (MBS) zone for providing a mobile Internet Protocol Television (IPTV) service, the method comprising:
    setting up a MBS zone based on a base station (BS) forming a cell having a mobile terminal; and
    setting up a MBS zone by allocating MBS channels to base stations adjacent to the base station (BS) according to a movement tendency that the mobile terminal moves from the base station (BS) to the base stations adjacent to the base station (BS).

2. The method of claim 1, wherein in the setting of the MBS zone by allocating MBS channels, the MBS channel is allocated to six adjacent base stations, into which the mobile terminal is movable from the base station (BS) forming the cell, thereby setting up a first MBS zone for the mobile terminal based on seven base stations including the base station (BS) forming the cell and the six adjacent base stations.

3. The method of claim 2, wherein in the setting of the MBS zone by allocating MBS channels, the MBS channel is allocated to twelve adjacent base stations, which are adjacent to the seven base stations forming the first MBS zone, thereby setting up a second MBS zone for the mobile terminal based on nineteen base stations including the seven base stations forming the first MBS zone and the twelve adjacent base stations.

4. The method of claim 3, wherein in the setting of the MBS zone by allocating MBS channels, the number of base stations used to form a MBS zone is determined between seven and nineteen based on the movement tendency including a direction or speed of movement of the mobile terminal.

5. The method of claim 1, wherein in the setting of the MBS zone by allocating MBS channels, the movement tendency is probabilistically calculated.

6. The method of claim 5, wherein in the setting of the MBS zone through allocating MBS channels, statistic information about the movement tendency is acquired and the movement tendency is probabilistically calculated based on the statistic information.

7. The method of claim 5, wherein in the setting of the MBS zone by allocating MBS channels, the MBS channel is allocated according to an order of priority that is placed on each of the adjacent base stations by use of the calculated probabilistic movement tendency.

8. A method of setting up a dynamic Multicast and Broadcast Service (MBS) zone in a mobile communication system including a mobile terminal, a base station, an Access Service Network Gateway (ASNG) gateway, an Authentication Authorization and Accounting (AAA) server and a MBS Controller Server, the method comprising:
    at the mobile terminal, making a request of the ASN gateway for a MBS service through a MBS zone that is formed of at least one base station;
    at the ASN gateway, making a request of the AAA server for authentication of the mobile terminal;

at the ASN gateway, making a request of the MBS Control Server for information about the requested MBS service, if the authentication of the mobile terminal is complete in the AAA server;

at the MBS Controller Server, allocating a MBS channel for each base station according to a movement tendency of the mobile terminal; and at the ASN gateway, instructing to set up a MBS zone based on the MBS channel that is allocated for each base station.

9. The method of claim 8, further comprising:

at the mobile terminal, receiving the MBS service through the set MBS zone that is set up.

10. The method of claim 8, further comprising:

at the mobile terminal, making a request of the ASN gateway for a MBS service through adjusting the set MBS zone, if a handoff occurs when the mobile terminal leaves a base station, which forms a cell where the mobile terminal exist, in the middle of receiving the MBS service via the set MBS zone.

11. The method of claim 8, wherein the requesting for authentication of the mobile terminal comprises:

at the ASN gateway, collecting subscriber identifier (ID) information, terminal identifier (ID) information and access node identifier (ID) information for the MBS service from the mobile terminal.

12. The method of claim 8, wherein in the requesting for the information about the MBS service, the ASN gateway makes a request of the MBS Control/Server for a profile about a MBS zone setting and the requested MBS service.

13. The method of claim 8, wherein the allocating of the MBS channel for each base station comprises:

at the MBS server, probabilistically calculating the movement tendency that the mobile terminal moves from a base station (BS) forming a cell having the mobile terminal to each base station adjacent to the base station (BS).

14. The method of claim 13, wherein the allocating of the MBS channel for each base station comprises:

acquiring statistic information about the movement tendency and probabilistically calculating the movement tendency based on the statistic information; or allocating the MBS channel according to an order of priority that is placed on each of the adjacent base stations by use of the calculated probabilistic movement tendency.

15. The method of claim 8, wherein the allocating of the MBS channel for each base station comprises:

at the MBS Control Server, providing the ASN gateway with service profile, schedule information and additional MBS zone information that are used to generate the MBS channel.

16. The method of claim 8, wherein the allocating of the MBS channel for each base station comprises:

determining the number of base stations used to form a MBS zone between seven or nineteen based on the movement tendency including a direction or speed of movement of the mobile terminal.

17. The method of claim 8, wherein the instructing of setting up the MBS zone comprises:

storing the MBS channel for the mobile terminal in a channel cache table included in each base station that creates the set MBS zone.

18. The method of claim 8, wherein the instructing of setting up comprises:

if a base station, which forms a MBS zone providing the mobile terminal with a MBS service, is excluded from forming a new MBS zone due to the movement tendency of the mobile terminal, removing a MBS channel for the mobile terminal from a channel cache table included in the base station.

* * * * *